United States Patent [19]

von Winckelmann

[11] Patent Number: 4,574,705

[45] Date of Patent: Mar. 11, 1986

[54] PRESSURIZED AIR VEHICLE TRANSPORTATION SYSTEM

[76] Inventor: Emil H. von Winckelmann, 7731 Amestoy St., Van Nuys, Calif. 91406

[21] Appl. No.: 583,982

[22] Filed: Feb. 27, 1984

[51] Int. Cl.⁴ .......................... B60V 3/04; B61B 13/12
[52] U.S. Cl. ................................ 104/23 FS; 104/156; 104/161; 406/86
[58] Field of Search ............ 104/23 FS, 134, 155–159, 104/161; 406/86, 88

[56] References Cited

U.S. PATENT DOCUMENTS

| | | | |
|---|---|---|---|
| 3,266,848 | 8/1966 | Pitkanen | 104/155 X |
| 3,586,382 | 6/1971 | Pitkanen | 104/23 FS X |
| 3,722,424 | 3/1973 | Van Veldhuizen | 104/23 FS |
| 3,889,602 | 6/1975 | Barber | 104/23 FS |
| 3,930,450 | 1/1976 | Symons | 104/161 X |

Primary Examiner—Randolph A. Reese
Attorney, Agent, or Firm—Keith D. Beecher

[57] ABSTRACT

An improved transportation system is provided by which vehicles may be propelled along the top of a duct on a cushion of pressurized air. The duct is provided with a grating on its upper surface through which the pressurized air is emitted from the interior of the duct, and a longitudinal slot extends along the grating. The lower surface of the grating is normally closed by a flexible belt which extends along the interior of the duct. The belt is depressed down from the grating as the vehicle moves along the top of the duct to permit air pressure in the duct to escape through the grating and thus support the vehicle on a cushion of air. At least one vane is attached to a carriage, the vane being supported on the lower end of an arm which depends from the vehicle and extends down through the slot into the interior of the duct. The vane extends across the interior of the duct. A pressure differential created within the duct on opposite sides of the vane serve to propel the vehicle along the top of the duct.

5 Claims, 5 Drawing Figures

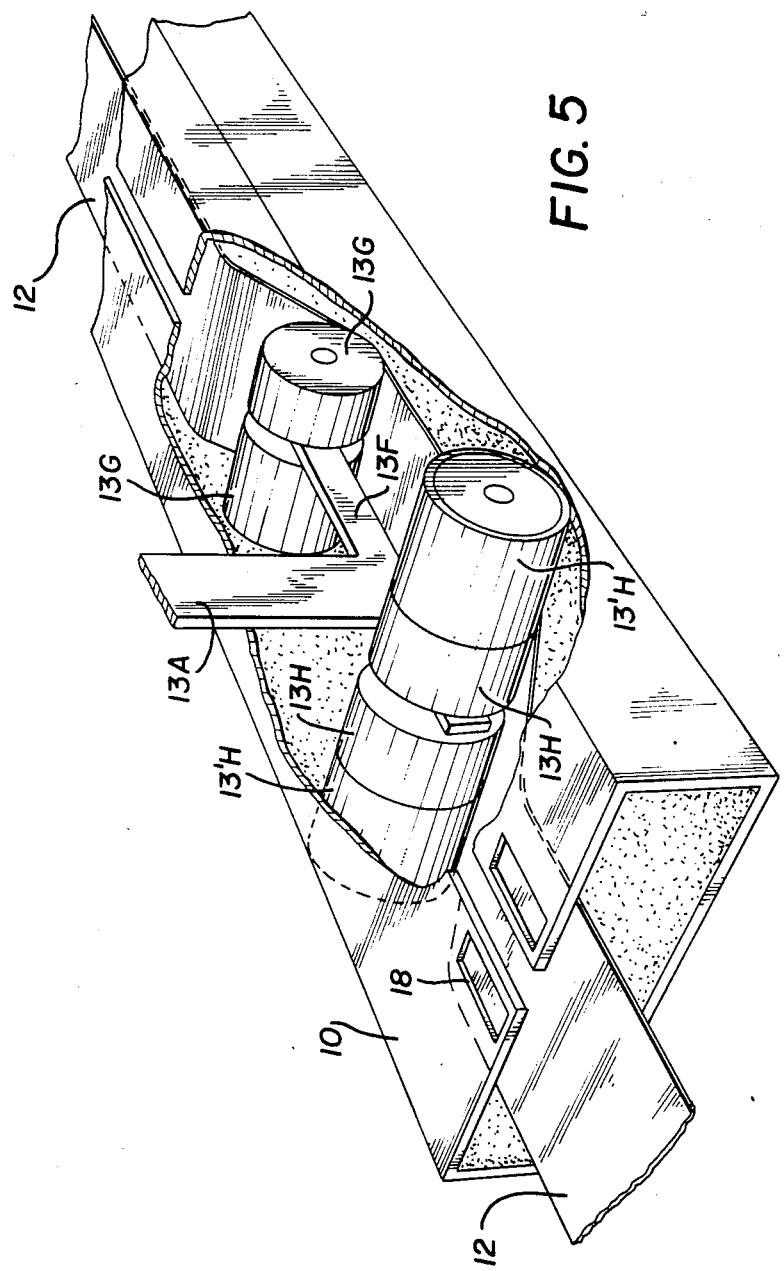

4,574,705

PRESSURIZED AIR VEHICLE TRANSPORTATION SYSTEM

BACKGROUND OF THE INVENTION

The transportation system of the present invention is of the general type described in U.S. Pat. Nos. 3,266,848 and 3,586,382, both of which issued in the name of Alan R. Pitkanen. A transportation system is described in each of the patents in which a vehicle is propelled along the top of a duct while supported on a cushion of escaping pressurized air traveling longitudinally along the path of the vehicle. The system described in each of the patents comprises a duct for conducting a flow of pressurized air, and a flexible belt positioned horizontally underneath a grating which is mounted in the top of the duct. The belt serves as a valving means for the passage of pressurized air through the grating so that the vehicle may be supported on a cushion of air and so that it may be propelled by the air along the top of the duct.

As mentioned above, the transportation system of the present invention is of the same general type as that described in the patents. However, the improved system of the present invention is constructed in such a manner that the vehicle is provided with at least one vane which is positioned within the duct and which responds to pressure differentials within the duct to provide a positive force for propelling the vehicle along the top of the duct.

The transportation system of the invention is advantageous in that it is noiseless and inexpensive because it involves vehicles which are positively driven at high rates of speed without friction losses. The system of the invention has a "fail-safe" feature since if for any reason air pressure is lost, the vehicle merely drops to the top surface of the duct and stops.

BRIEF DESCRIPTION OF THE DRAWINGS

FIG. 5 is a view like FIG. 2, of a modified version of the vehicle.

DETAILED DESCRIPTION OF THE ILLUSTRATED EMBODIMENT

Figure 1:
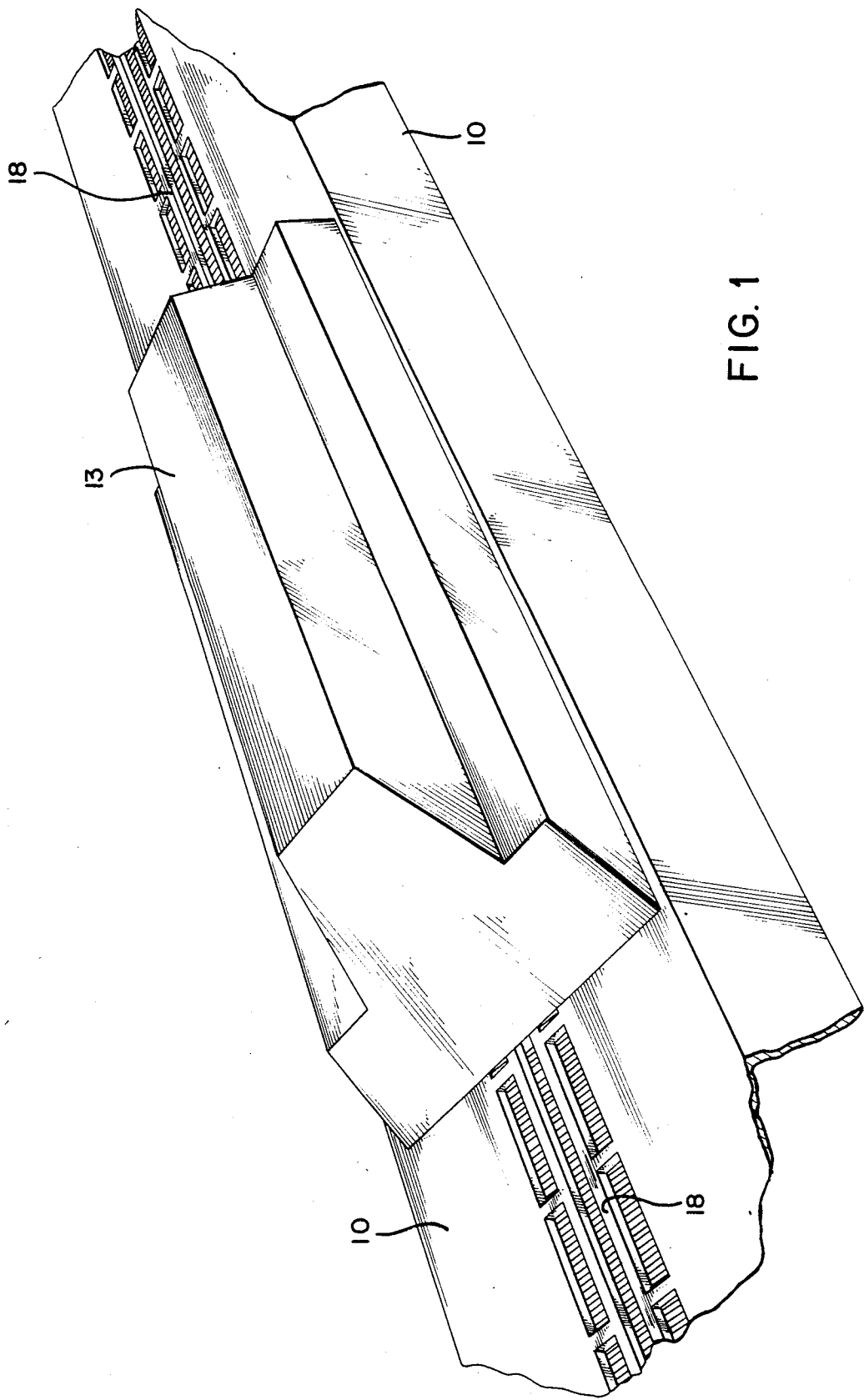
FIG. 1 is a perspective view showing a portion of a duct and a vehicle on top of the duct both of which are constructed to embody the concepts of the invention.
Figure 2:
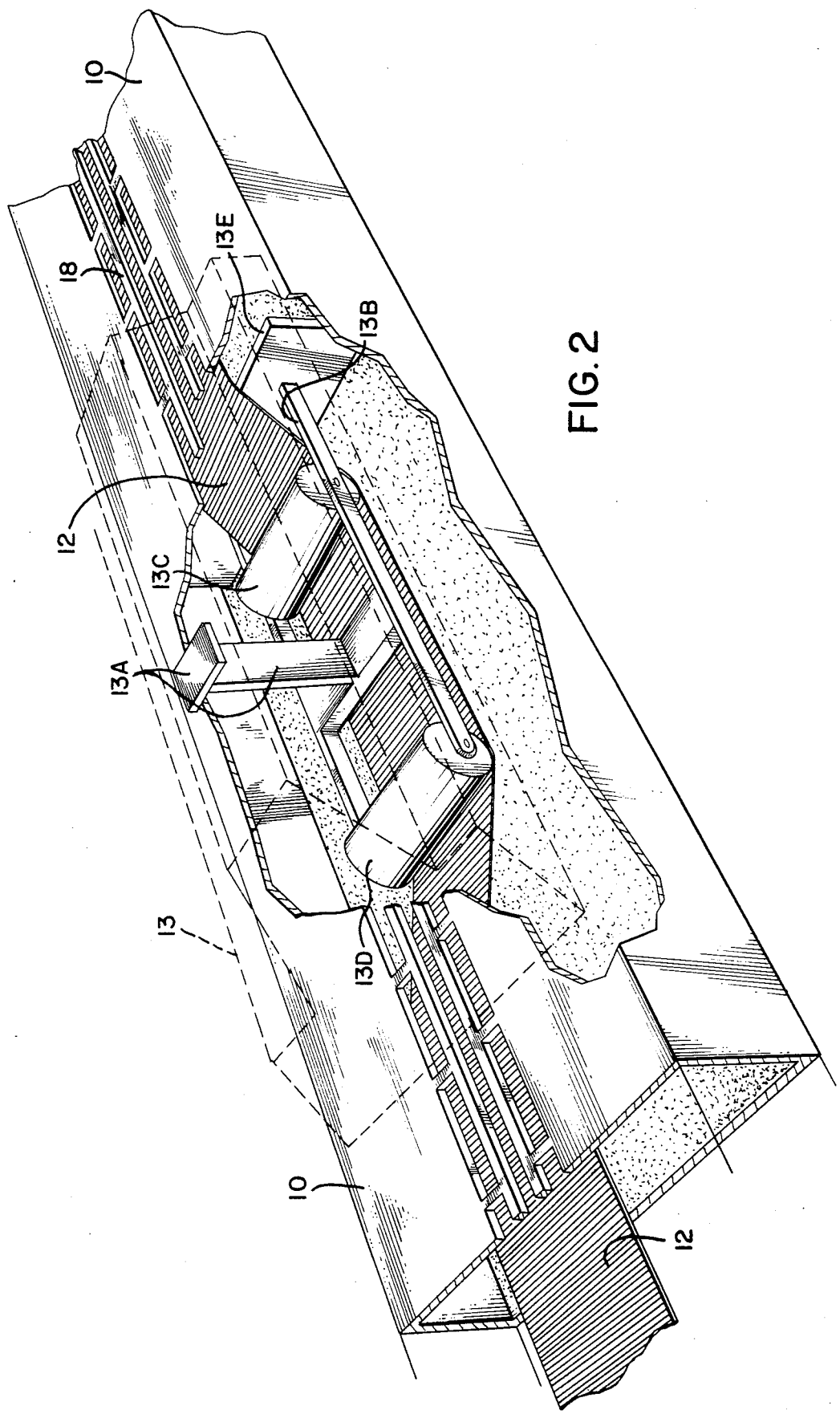
FIG. 2 is a view like FIG. 1, but with the body of the vehicle removed, and with a portion of the duct broken away to reveal certain internal operating components of the transportation system of the invention.

The transportation system shown in FIGS. 1 and 2 comprises generally a duct 10, which may be composed of concrete. Pressurized air is introduced into the duct 10, for example, through a series of inlets, such as inlets 10A, 10B at spaced intervals along the length of the duct. A grating 18 is mounted on the top side of the duct, and a slot extends along the grating from one end to the other. A belt 12 extends along the underside of the grating, and this belt is pressed against the grating by the air pressure in the duct serving normally to close the grating.

A vehicle 13 is positioned on top of the grating 18, and it is spaced upwardly from the grating by a cushion of pressurized air escaping from the interior of the duct through the grating. A vertical arm 13A extends downwardly through the slot in the grating from the vehicle, and a carriage 13B is mounted on the lower end of the arm. The carriage includes a pair of rollers 13C, 13D which engage the belt and which move the portion of the belt under the vehicle down from the grating, as shown in FIG. 2, so that air escapes through the grating to form an air cushion under the vehicle. As the vehicle moves along the top of the grating, the portion of the belt under the vehicle which is displaced away from the grating moves with the vehicle with a wave-like configuration, and the belt behind the vehicle is re-sealed against the under surface of the grating. The rollers 13C and 13D, and especially the rear roller 13C, also contribute to the forward motion of the vehicle, as they ride the wave created in the belt.

Figure 3:
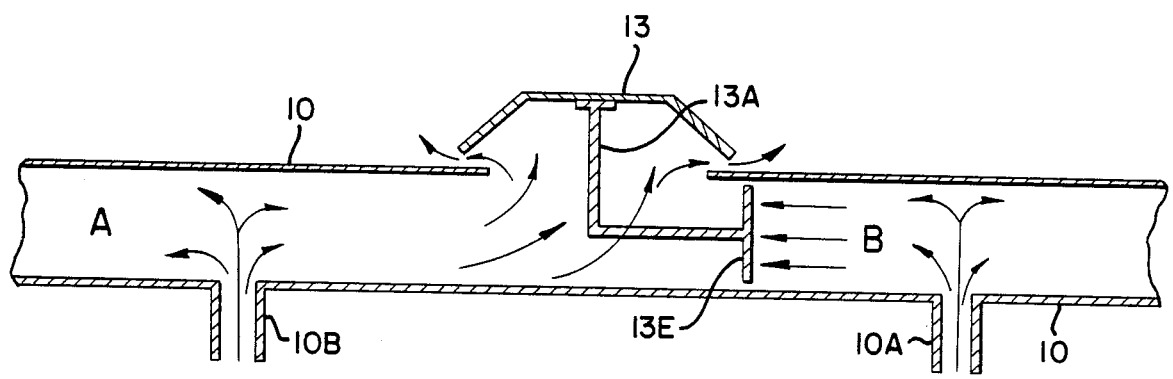
FIG. 3 is a schematic functional diagram illustrating the manner in which the system of FIG. 2 operates.

As shown in FIG. 3, the air from inlet 10B which pressurizes section "A" of the interior of the duct 10 passes through grating 18, so as to form a cushion of air under the vehicle 13. The air from inlet 10A, on the other hand, which pressurizes section "B" of the interior exerts a force against a vane 13E which is attached to the rear of the carriage 13B. This force propels the vehicle in the forward direction. The air flow in front of the vane creates a vacuum condition which aids in the forward thrust of the vehicle.

Figure 4:
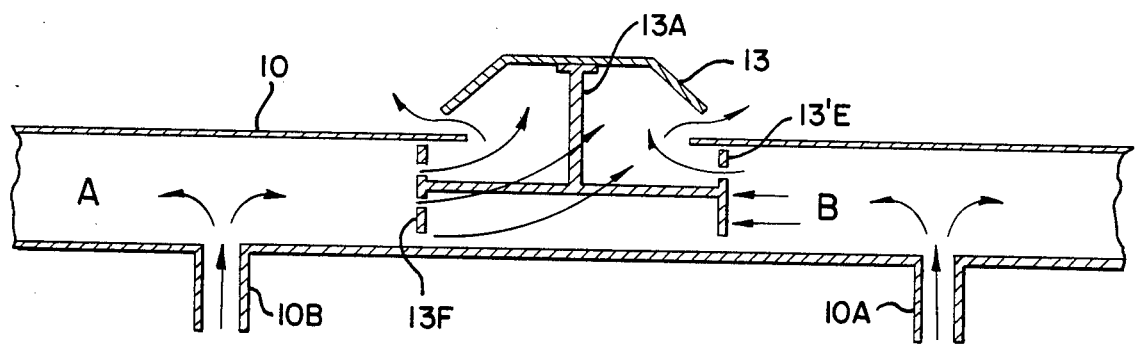
FIG. 4 is a schematic functional diagram of a modified version of the system.

In the embodiment of FIG. 4, a forward vane like member 13F is mounted on the carriage, in addition to the rear vane like member 13'E. Both vane-like members have controllable openings therein so that the vehicle may be stopped, and driven at controllable speeds in the forward or reverse directions.

In the embodiment of FIGS. 5, a horizontal arm 13F is formed integral with the lower end of arm 13A. A pair of forward wheels 13G are rotatably mounted at the forward end of arm 13F; and a pair of rear wheels 13H are rotatably mounted at the rear end of arm 13F. Wheels 13G and 13H engage belt 12 in the same way as the rollers 13C and 13D of FIG. 2.

In the embodiment of FIG. 5, the rear wheels are extended to the sides of the duct by extended portions 13'H, so that the rear wheels function in the same manner as vane like member 13E in FIG. 2. That is, the pressure against the rear wheels 13H, 13'H propels the vehicle along the duct.

The extended sections 13'H of the rear wheels 13H may have a vane-like configuration if so desired.

The invention provides, therefore, a transportation system in which a vehicle is propelled along the top of a pressurized air duct, with pressurized air from the interior of the duct being caused to escape through a grating formed in the upper surface of the duct. The grating has a central slot, and an elongated arm depends from the vehicle through the slot into the interior of the duct. A carriage is mounted on the lower end of the arm, and at least one vane like member is mounted on the carriage and extends across the interior of the duct to constitute the means for causing the vehicle to be propelled along the top of the duct.

The system of the invention is advantageous in that it is highly efficient, and the vehicle is driven at high speed in a completely silent manner. Also, as mentioned above, the system is absolutely safe, in that should air pressure be lost, the vehicle merely drops to the surface of the duct and stops.

It will be appreciated that while particular embodiments of the invention have been shown and described, modifications may be made. It is intended in the following claims to cover all modifications which come within the true spirit and scope of the invention.

What is claimed is:

1. A transportation system comprising: a longitudinal duct carrying a pressurized air; a grating mounted on the top side of the duct through which the pressurized air in the duct may escape, said grating having a longitudinal slot therein; a belt positioned in the duct and extending along the underside of the grating from one end of the grating to the other to be forced against the grating by the pressurized air in the duct normally to prevent the escape of pressurized air through the grating; a vehicle positioned on the top side of the duct to be supported on an air cushion on top of said grating; an arm mounted on the vehicle and depending downwardly therefrom and extending through said slot into the interior of the duct; a vane-like member positioned in the interior of the duct to be interposed in said pressurized air; means mounting the vane-like member on the lower end of said arm in position to extend across the interior of the duct interposed in said pressurized air to be propelled along the duct by pressure differentials in said pressurized air so as to cause the vehicle to move along the top of the duct; and a carriage mounted within the duct on the lower end of said arm and having roller means engaging the top surface of the belt to move the portion of the belt underlying the vehicle downwardly from the underside of the grating as the vehicle is so moved along the top of the duct to permit pressurized air to escape through the grating to create said pressure differentials in the interior of the duct and to create said air cushion for supporting the vehicle.

2. The transportation system defined in claim 1, in which the vane-like member is mounted on the rear end of the carriage.

3. The transportation system defined in claim 2, and which includes a second vane-like member mounted on the forward end of the carriage and extending across the interior of the duct in spaced parallel relationship with the first-named vane-like member.

4. The transportation system defined in claim 1, in which said duct has a plurality of inlets therein for introducing pressurized air to the interior of the duct, said inlets being spaced at intervals along the length of the duct.

5. The transportation system defined in claim 1, in which at least one of said roller means has a length corresponding substantially to the inner width of said duct to extend to the sides of the duct to constitute said vane-like member.

* * * * *